United States Patent [19]
Bradford et al.

[11] Patent Number: 5,496,989
[45] Date of Patent: Mar. 5, 1996

[54] WINDSHIELD TEMPERATURE CONTROL SYSTEM

[75] Inventors: Michael P. Bradford, Orange; Thomas Perrotta, Brookfield, both of Conn.

[73] Assignee: United Technology Corporation, Hartford, Conn.

[21] Appl. No.: 238,553

[22] Filed: May 5, 1994

[51] Int. Cl.$^6$ .................... H05B 1/02; B60L 1/02
[52] U.S. Cl. .................. 219/497; 219/494; 219/482; 219/522; 307/10.1; 244/129.3
[58] Field of Search ................ 219/202–206, 219/482, 491, 494, 497, 501, 506, 522, 543; 296/84.1; 307/10.1; 244/129.3

[56] References Cited

U.S. PATENT DOCUMENTS

| 3,934,111 | 1/1976 | Roselli et al. | 219/203 |
| 4,636,643 | 1/1987 | Nakamura et al. | 250/338 |
| 5,057,666 | 10/1991 | Takada | 219/203 |

Primary Examiner—Mark H. Paschall
Attorney, Agent, or Firm—Michael Grillo

[57] ABSTRACT

A windshield temperature control system (200) monitors aircraft operating (240) and environmental (246) conditions, and determines, based on the fixed physical properties of the windshield (250,251), a required film temperature necessary to produce a heat output to maintain the internal and/or external temperature of the windshield at a desired temperature. The heat output is based on a total heat loss including internal heat loss and external convective, evaporative, sensible and radiation heat loss, and a film temperature error defined as the difference (340) between required film temperature and actual film temperature is applied via proportional (355) and integral (350) control paths to produce zero steady state film temperature error. The desired external temperature is selected to be sufficiently above freezing, i.e., 0° C., to prevent ice formation on the windshield, and the desired internal temperature is selected to be sufficiently above the cockpit air dew point to prevent condensation on the internal surfaces of the windshield. During start-up at low film temperature, film temperature error is filtered (315) to gradually heat up the film at a rate dependent upon the magnitude of the error. After a warm-up delay (307), film temperature error is compared to a fixed temperature error limit (385), the exceedance of which will cause termination of film heating (390) to thereby prevent over temperature of the windshield.

37 Claims, 3 Drawing Sheets

5,496,989

WINDSHIELD TEMPERATURE CONTROL SYSTEM

The Government has rights in this invention pursuant to Contract No. DAAJ09-91-C-A004 awarded by the Department of the Army.

TECHNICAL FIELD

The present invention relates to windshield temperature control, and more particularly to a control system for providing improved control of windshield temperature to thereby minimize ice and fog build-up, power usage, and windshield infrared (IR) signature while also increasing fault tolerance.

BACKGROUND OF THE INVENTION

Existing windshield anti-ice systems and fog control systems typically include a thin resistive layer made of a semiconductor material deposited between transparent inner and outer windshield surfaces. Typically, the inner windshield surface is made of polycarbonate and the outer windshield surface may be made of glass, polycarbonate, herculite acrylic or other suitable material. The inner windshield surface is formed into the desired final shape, and the resistive layer is deposited on the external facing side of the inner windshield surface. For example, the resistive layer may be made of indium tin oxide which is sprayed on the inner windshield surface. Thereafter, an adhesive interlayer of a known film adhesive, such as urethane, is deposited on the resistive layer to secure the outer windshield surface.

Referring to FIG. 1, existing anti-ice systems typically feature a single channel, isolated, analog controller 10 that pulses electric current to a windshield heating film 20 based on the temperature of windshield interior surface. One or two temperature sensors 12 are provided to monitor the windshield interior surface temperature, and when the temperature falls below a threshold level, the controller 10 activates a relay coil 17 which in turn activates a normally open contact 18 of a relay 19 to apply current to the resistive layer 20, thereby heating the windshield 22. When the windshield interior temperature exceeds a threshold value, the controller switches off the relay 19 to remove the current from the resistive layer 20.

There are several draw backs to the existing method of deicing and defogging a windshield. First, the controller and relay are heavy, exacting a weight penalty which is particularly important on aircraft. Additionally, the temperature threshold for turning off the controller is based on the worst case conditions which the windshield will encounter, e.g. the coldest, highest moisture content, fastest airspeed, etc. This results in a windshield temperature that is almost always higher than necessary to adequately perform the deice and/or defog function. Additionally, unnecessarily high windshield temperatures adversely affect the IR signature of the windshield, which is particularly important in the case of military vehicles.

Another problem associated with existing methods of deicing and defogging a windshield is that isolated analog controllers have little available fault tolerance. Therefore, erroneous sensor data or an errant controller function may lead to an over temperature condition which may be destructive to the windshield optical properties. In order to prevent over temperature of the windshield from occurring, the vehicle operator, e.g., pilot, must pull a system circuit breaker or take some other affirmative action to prevent the over temperature from occurring. Over temperature conditions can affect the heating film in such a manner to seriously tint the transparency of the windshield. Additionally, in windshields containing an acrylic outer layer, an over temperature condition can potentially de-laminate and shrink the outer transparent ply.

DISCLOSURE OF INVENTION

Objects of the invention include the provision of a windshield temperature control system which determines the required heat output of a windshield resistive layer based on actual operating and environmental conditions to thereby reduce the required electrical power and to minimize the windshield IR signature.

Another object of the invention is to provide a fault tolerant windshield temperature control system which minimizes the action required by an operator to prevent a windshield over temperature condition.

A further object of the present invention is to provide a windshield temperature control system having a warm up cycle to thereby prevent thermal shock to the windshield during extreme cold weather conditions.

A still further object of the present invention is to provide a windshield temperature control system having an adaptive over-temperature warning that adjusts to operating conditions and can automatically sever power to a resistive heater in the event of an undesirable over temperature condition.

According to the present invention, a windshield temperature control system monitors aircraft operating and environmental conditions, and determines, based on the fixed physical properties of the windshield, a required film temperature necessary to produce a heat output to maintain the internal and/or external temperature of the windshield at a desired temperature.

In further accord with the present invention, the heat output is based on a total heat loss including internal heat loss and external convective, evaporative, sensible and radiation heat loss, and a film temperature error defined as the difference between required film temperature and actual film temperature is applied via proportional and integral control paths to produce zero steady state film temperature error.

In still further accord with the present invention, the desired external temperature is selected to be sufficiently above freezing, i.e., 0° C., to prevent ice formation on the windshield, and the desired internal temperature is selected to be sufficiently above the cockpit air dew point to prevent condensation on the internal surfaces of the windshield.

According further to the present invention, during start-up at low film temperature, film temperature error is filtered to gradually heat up the film at a rate dependent upon the magnitude of the error.

According still further to the present invention, after a warm-up delay, film temperature error is compared to a fixed temperature error limit, the exceedance of which will cause termination of film heating to thereby prevent over temperature of the windshield.

The present invention provides a significant advantage over the prior art because windshield temperature is maintained at a small but adequate margin above the minimum required temperature to achieve the desired deicing or defogging of the windshield. By only heating the windshield based on the environmental conditions the windshield is exposed to, the amount of power required to provide windshield heating is as low as practical, thereby beneficially effecting fuel consumption and minimizing the windshield IR signature. Damage to the windshield is prevented by providing an automatic warm-up cycle to preclude damage due to thermal shock in extreme cold temperatures, and by also providing automatic disconnect in the event of an over temperature condition. Finally, the signals used to determine the heat output of the resistive film are already available on most sophisticated aircraft, therefore the system requires few dedicated components to achieve an improved windshield temperature control system.

The foregoing and other objects, features, and advantages of the present invention will become more apparent in light of the following detailed description of exemplary embodiments thereof, as illustrated in the accompanying of the drawings.

BEST MODE FOR CARRYING OUT THE INVENTION

The windshield temperature control system of the present invention is particularly well suited for minimizing ice and fog build up on a windshield while also minimizing power usage required to accomplish the deicing and defogging, minimizing the infrared radiation signature of the windshield, and minimizing the possibility of inadvertent damage to the windshield caused by overheating.

The present invention will be described in the context of a windshield located on a modern helicopter; however, it will be understood by those skilled in the art that the temperature control of the present invention is applicable to windshields contained on any type of vehicle including a fixed wing aircraft, a land vehicle, a waterborne vehicle, or any other type of vehicle having a windshield.

Figure 1:
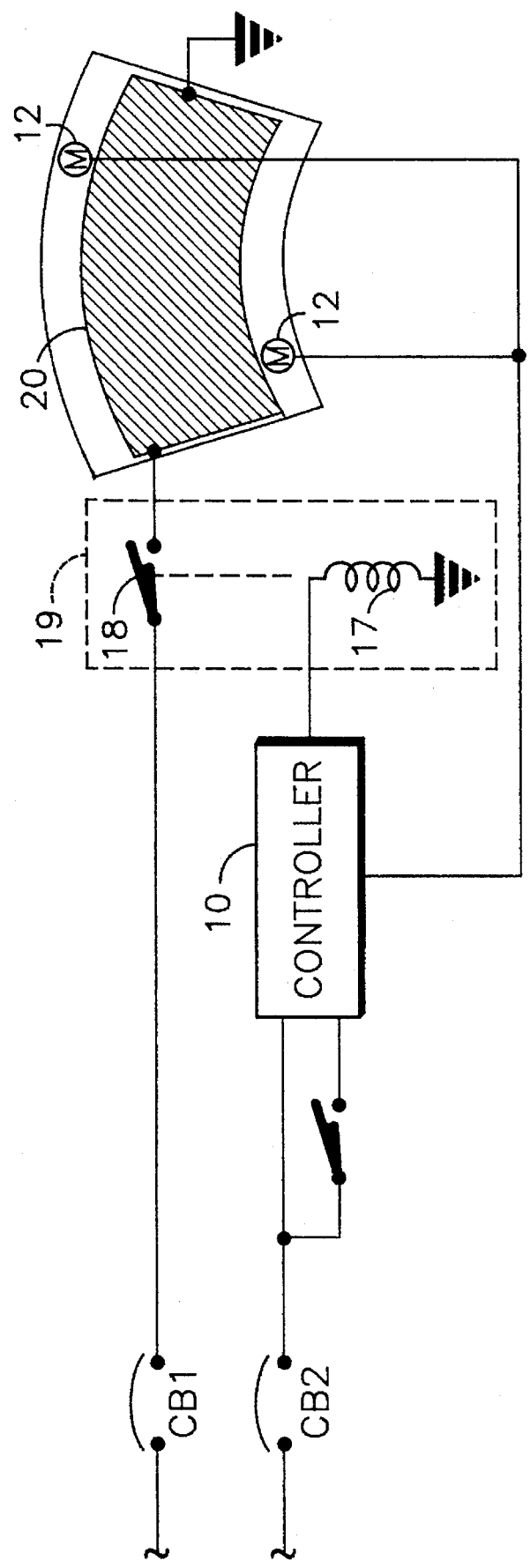
FIG. 1 is a schematic block diagram of a prior art windshield temperature control system.
Figure 2:
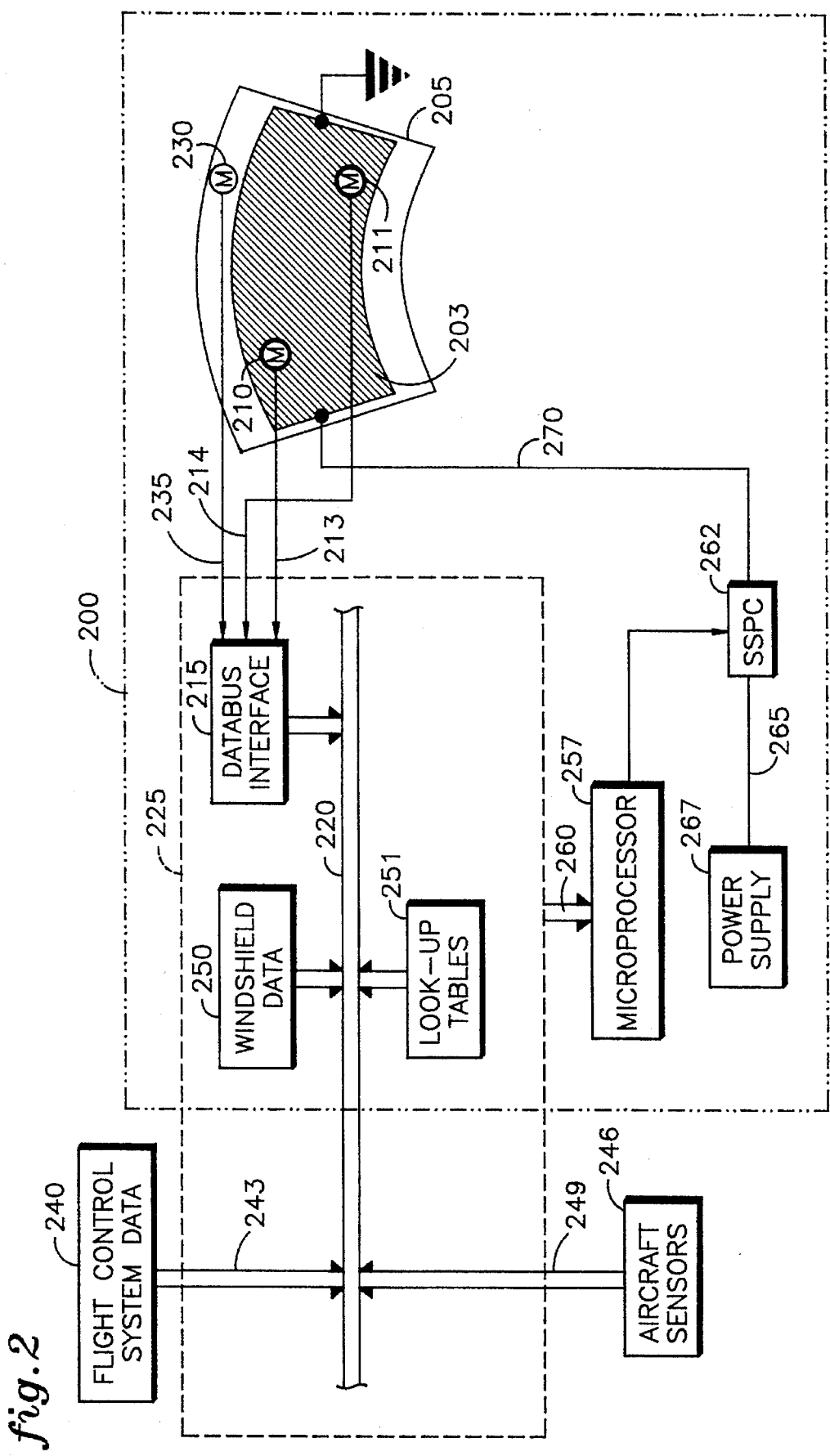
FIG. 2 is a schematic block diagram of a windshield temperature control system of the present invention.

Referring to FIG. 2, the windshield temperature control system 200 is used to control the heat output of a resistive film 203 of a helicopter windshield 205. As described in the background section, a resistive film 203 used for deicing and defogging is usually an internal layer of the windshield 205; however, it is anticipated that the temperature control system of the present invention is also applicable to resistive films located on an inner or outer surface of a windshield. The control system of the present invention controls the heat output of the resistive film 203 by controlling the resistive film temperature ($T_f$).

The resistive film temperature is measured by one or more temperature sensors 210, 211 which provides temperature signals on lines 213, 214 to a databus interface 215. The temperature sensors 210, 211 may be directly imbedded in the resistive layer to provide an accurate temperature indication thereof. The databus interface 215 comprises the necessary signal conditioning and processing equipment to convert input signals, such as the film temperature signals on the lines 213, 214, into digital signals which are provided to a main databus 220. For example, if the film temperature signal on the lines 213, 214 is an analog signal, the databus interface will comprise an analog to digital converter and other signal conditioning equipment to thereby produce digital signals indicative of the film temperature. The databus interface 215 and main databus 220 are part of a mission equipment package 225. The mission equipment package contains a plurality of databus interfaces and is responsive to signals provided by various aircraft subsystems to thereby provide a compilation of data related to the operational status of the aircraft and various aircraft subsystems. Additionally, the mission equipment package is provided with various sensor data related to the operational environment in which the aircraft is operating. The information available on the main databus 220 of the mission equipment package 225 is used by a variety of systems and subsystems in addition to the windshield temperature control system.

A temperature sensor 230 may be used to provide redundant temperature measurement signals indicative of the internal surface temperature ($T_{si}$) of the windshield 205. The windshield internal surface temperature reading is provided on line 235 to the databus interface 215. Various flight control system data required by the windshield temperature control system 200 is provided from the flight control system 240 on the lines 243 to the main databus 220. The flight control system data of concern to the windshield temperature control system includes aircraft pitch angle and airspeed. Additionally, various other aircraft sensors 246 provide data signals on the lines 249 to the main databus 220. The aircraft sensor data of interest to the windshield temperature control system includes the outside air temperature, the static pressure, the temperature in the cockpit, and aircraft altitude.

Memory devices 250 and 251 may be provided to store values indicative of the characteristics of the aircraft windshield, and various other values of interest. The windshield characteristic data of interest includes the surface area of the windshield, a windshield geometry correction factor, windshield characteristic length, windshield tilt angle, windshield sweep back angle, and the emissivity of the windshield. Other data of interest includes the latent heat vaporization of water, the vapor pressure of water at various temperatures, the specific heat of water, and the Stefan-Boltsman constant. A microprocessor 257 utilizes the data on the main databus 220 as provided on the lines 260 in a plurality of equations and subroutines described hereinafter for controlling the operation of a solid state power controller (SSPC) 262 for applying a supply voltage on a line 265 from a power supply 267 to the resistive film 203 via the line 270.

Although separate data storage devices and look-up tables 250 and 251 are described as containing data related to the windshield physical characteristics and various other physical constants, such data may alternatively be provided as part of the subroutines performed by the microprocessor 257 for controlling the operation of the SSPC 262.

During operation of the windshield temperature control system in the deice mode, the microprocessor 257 attempts to control the SSPC 262 to apply the line voltage on the line 265 to the resistive film 203 to achieve a resistive film temperature such that sufficient heat is produced by the film to raise the outside temperature of the windshield 205 to prevent ice formation and to melt any ice thereon. Similarly, in the defog mode, the microprocessor 257 controls the SSPC 262 to apply the line voltage 265 to the resistive film 203 to achieve a resistive film temperature sufficient to produce enough heat to raise the windshield internal temperature above the dew point of the air in the cockpit.

The operation of the windshield temperature control system will first be described with respect to the deice function.

Figure 3:
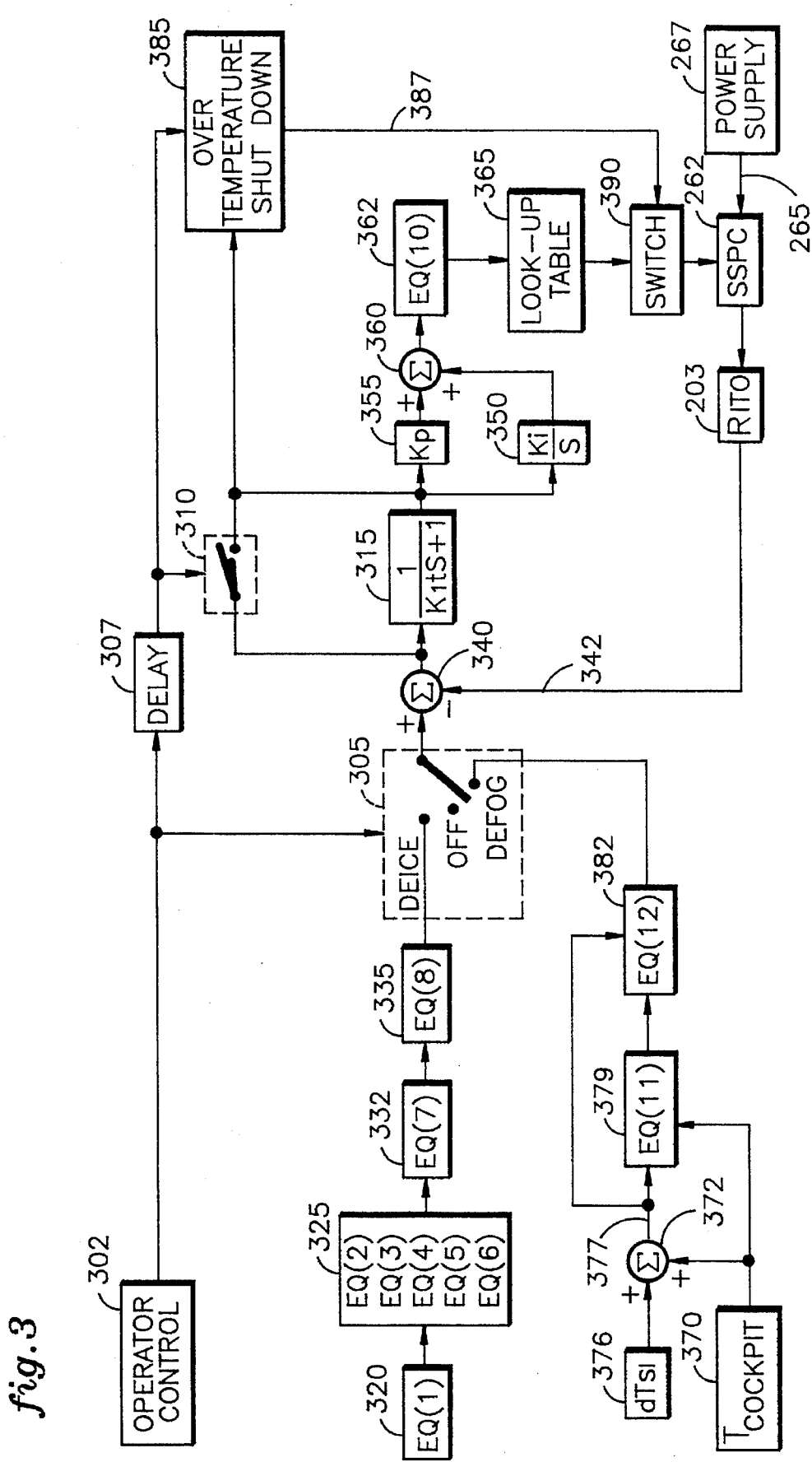
FIG. 3 is a more detailed schematic block diagram of the windshield temperature control utilized by the control system of FIG. 2.

Referring to FIG. 3, a target or desired windshield outer surface temperature ($T_{so}$) must first be selected that is sufficiently high to melt ice on the external surface of the windshield and also to prevent the formation of ice thereon, e.g., 1.5° C. During operation in the deice mode, the system will control the resistive film temperature to attempt to maintain $T_{so}$. The pilot selects the deice mode by placing a cockpit control 302 in a deice position, thereby activating a switch 305 to the deice position and also activating a delay function 307. As will be described in greater detail hereinafter, the delay function in combination with a switch 310 and a filter 315, operate to provide an automatic warm-up cycle of the windshield to prevent windshield thermal shock at extremely cold temperatures.

During operation in the deice mode, the system utilizes the following equations 1 through 10 to determine the required resistive film temperature to achieve the desired $T_{so}$. Equations 1 through 10 will be described with respect to function blocks 320 through 362 in FIG. 3 for purposes of describing the present invention; however, it will be understood by those skilled in the art that the equations may simply be provided as a subroutine or series of subroutines performed by the microprocessor 257 to achieve the desired result. The equations are illustrated as being sequentially performed in the functional block diagram of FIG. 3 because certain of the later equations utilize the results of the previous equations. However, it will be understood by those skilled in the art that all of the equations may be performed in a matter of a few hundred milliseconds depending on the speed of the microprocessor utilized to perform the equations. In function block 320, the microprocessor performs equation 1 below to determine the velocity of the air parallel to the windshield surface ($V_s$):

$$V_s = V_\infty \times \cos\theta \times \cos\Phi \times C_f \qquad \text{(eq. 1)}$$

where $V_\infty$ is vehicle airspeed; $\theta$ is the windshield tilt angle; $\Phi$ is aircraft pitch angle; and $C_f$ is a correction factor based on aircraft physical geometry.

Next, in function block 325, the external heat loads on the windshield are calculated including convective heat loss ($q_c$), evaporative heat loss ($q_e$), sensible heat loss ($q_s$), and radiation heat loss ($q_r$). An external convection coefficient ($h_o$), calculated in equation 2 below, is utilized by equations 3 through 6 below to determine the external heat loads on the windshield surface:

$$h_o = 0.64 \times \left(\frac{T_{OAT} + T_{so}}{2}\right)^{.3} \times \left(\frac{(1.69 \rho g V_s)^{.8}}{L_x^2}\right) \qquad \text{(eq. 2)}$$

where $T_{OAT}$ is the outside air temperature; $T_{so}$ is the external surface temperature of the windshield; $\rho$ is the density of air; $g$ is the gravitational constant; and $L_x$ is the windshield characteristic length.

Next, the convective heat loss is calculated in equation 3:

$$q_c = h_o \times A \times \left(T_{so} - \left(T_{OAT} + \left(\frac{R_f}{2gJC_p} \times V_s^2\right)\right)\right) \qquad \text{(eq. 3)}$$

where $A$ is the surface area of the windshield; $R_f$ is a recovery factor related to the energy in air molecules based on their velocity; $j$ is a conversion factor related to the mechanical equivalent of heat; and $C_p$ is the specific heat of air.

In equation 4, the evaporative heat loss is calculated:

$$q_e = A \times 2.91 \times L_s \times h_o \times \left(\frac{P_{ws} - P_{wo}}{P_{static}}\right) \qquad \text{(eq. 4)}$$

where $L_s$ is the latent heat of vaporization of water, $P_{ws}$ is the vapor pressure of water at window outside surface temperature, $P_{wo}$ is the vapor pressure of water at $T_{OAT}$, and $P_{static}$ is the ambient static pressure.

The sensible heat loss, which is related to the difference in temperature between $T_{so}$ and $T_{OAT}$, is given in equation 5 below:

$$q_s = .225 \times E_m \times A \times \sin\theta \times \cos\phi \times V_s \times LWC \times \qquad \text{(eq. 5)}$$
$$C_{pw} \times \left(T_{so} - \left(T_{OAT} + \left(\frac{R_f}{2gJC_p} \times V_s^2\right)\right)\right)$$

where $E_m$ is a collection efficiency constant based on windshield geometry; $\phi$ is the windshield sweep back angle; LWC is the input from the aircraft ice rate meter (if available), or from a lookup table (as a function of $T_{OAT}$); and $C_{pw}$ is the specific heat of water.

Finally, the radiation heat loss is calculated in equation 6 below:

$$q_r = \sigma \times \epsilon \times A \times (T_{SO}^4 - T_{OAT}^4) \qquad \text{(eq. 6)}$$

where $\sigma$ is the Stefan-Boltsman constant and $\epsilon$ is the emissivity of the windshield.

In function block 332, the microprocessor performs equation 7 to determine the total heat load on the windshield external surface:

$$q_o = q_c + q_e + q_s + q_r \qquad \text{(eq. 7)}$$

Next, in function block 335, equation 8 is performed to determine the required film temperature ($T_f$):

$$T_f = \left(q_o \times \left(\frac{k_o}{t_o}\right)\right) + T_{so} \qquad \text{(eq. 8)}$$

where $k_o$ is the outer ply conductivity and $t_o$ is the outer ply thickness.

The desired film temperature provided from equation 8 in function block 335 is provided via the operator control switch 305 to a summing junction 340. The other input to this summing junction 340 is the actual film temperature on a line 342. The output of the summing junction 340 is a film temperature error signal ($T_e$) which is applied to the switch 310 and the filtering function 315. When the deice mode is initially activated, the delay operates to keep the switch 310 open for a delay period $t_{delay}$, and the filtering function 315 acts to gradually apply the temperature error to gradually warm up the windshield resistive layer. After the expiration of the delay period 307, the switch 310 is activated to the closed position, and the entire temperature error is applied to warm up the windshield resistive layer.

The output of the switch 310 and the filtering function 315 are provided via an integral path containing an integral function 350 and a proportional path containing a proportional function 355 to a summing junction 360. The provision of proportional plus integral control results in a zero steady state film temperature error. The proportional path gain ($K_p$) and the integral path gain ($K_i$) are determined such that the output of the summing junction 360 is a total power requirement, $q_t$, e.g., $q_o + q_i$, for the resistive film. $q_o$ is given in equation 7 above, and the heat flow into the cockpit ($q_i$) can be calculated using equation 9 below based on $T_f$ from equation 8:

$$q_i = U_i \times A \times (T_f - T_{cockpit}) \qquad \text{(eq. 9)}$$

where $U_i$ is the internal heat transfer coefficient (from a lookup table based on the inner ply conductivity, $k_i$, the inside convection coefficient, $h_i$, and the inner ply thickness, $t_i$).

Therefore, the output of the summing junction 360 is the total power requirement of the resistive film. The required voltage supply, e.g., the pulse train root-mean-square voltage ($V_{RMS}$), required to be supplied to the resistive film by the SSPC to achieve the desired film temperature, and therefore film heat output, is determined in the function block 362 using equation 10 below:

$$V_{RMS} = \sqrt{R_{ITO} \times (q_i + q_o)} \quad \text{(eq. 10)}$$

where $R_{ITO}$ is the resistance of the resistive film.

Finally, a look-up table 365 is used to determine the required on/off cycle time of the SSPC based on the $V_{RMS}$ value to achieve the desired power output of the resistive film. Alternatively, an algebraic function may be used to determine the required SSPC cycle time.

If the pilot places the operator control switch in the defog position, equations 11 and 12 are utilized to determine the film temperature for defog purposes. For purposes of defogging, the cockpit temperature will always be equal to or greater than the cockpit dew point temperature. Therefore, the cockpit temperature 370 is summed 372 with a fixed temperature differential ($dT_{si}$) 376, e.g., 5° C., to determine the desired windshield internal surface temperature ($T_{si}$) on a line 377. In function block 379, the microprocessor performs equation 11 to determine the internal heat loss associated with the desired internal windshield surface temperature:

$$q_i = h_i \times A \times (T_{si} - T_{cockpit}) \quad \text{(eq. 11)}$$

Thereafter, equation 12 below is utilized in function block 382 to determine the required film temperature to achieve the desired internal windshield surface temperature:

$$T_f = \left( q_i \times \left( \frac{k_i}{t_i} \right) \right) + T_{si} \quad \text{(eq. 12)}$$

Once the defog film temperature is determined, the windshield heating is achieved as described herein above with respect to the deice film temperature.

When the deice or defog mode of the windshield temperature control system is initially activated, there may be an extremely large temperature differential between the windshield film temperature commanded by $T_e$ and the actual film temperature, particularly in extremely cold weather. To prevent thermal shock to the window under such conditions, a slow warm up is provided by filtering function 315 in combination with delay function 307 and switch 310 as described herein above. At the expiration of the delay period, $T_e$ should be comparatively small, with the actual film temperature generally tracking the desired film temperature. During normal operations after the expiration of the delay period, a large $T_e$ indicates that there is a problem with the windshield temperature control system. Therefore, a shutdown function 385 is provided to terminate voltage supply to the windshield resistive film to prevent overheating and damage to the window. The shutdown function is responsive to the output of the delay function 307 and $T_e$ (at the output of the switch 310) to provide a signal on a line 387 a switch 390 if the delay period has expired and $T_e$ is greater than a threshold, e.g., 40° C. When activated, the switch 390 causes the SSPC to secure the voltage supply to the resistive film 203.

If redundant protection against windshield over temperature is desired, further protection may be provided by monitoring film temperature and/or the windshield inner surface temperature. In either case, a set point or threshold may be selected for securing the voltage supply to the resistive film before damage to the windshield occurs.

The mission equipment package is shown as being separate from the microprocessor. However, as will be understood by those skilled in the art, a separate mission equipment package and microprocessor are not necessarily required in order to perform the functions identified in the present invention. Alternatively, a single vehicle control computer or mission computer may be provided to perform the above identified functions.

Although the invention has been described and illustrated with respect to exemplary embodiments thereof, it should be understood by those skilled in the art that the foregoing and various other changes, omissions and additions may be made therein and thereto without departing from the spirit and scope of the present invention.

We claim:

1. A windshield temperature control system comprising:

a windshield having heating means which heats said windshield in response to the application of a voltage to said heating means;

voltage supply means for providing a supply voltage;

power control means which applies said supply voltage to said heating means in response to a control signal and which disconnects said supply voltage from said heating means in response to the absence of said control signal;

the system being characterized by:

a temperature sensor for measuring the actual temperature of said heating means;

means for providing windshield characteristic data indicative of fixed physical properties of said windshield;

means for measuring parameters indicative of windshield operating environment; and processing means responsive to said windshield characteristic data and said parameters indicative of windshield operating environment for determining a desired heating means temperature to produce a heat output, for determining an error signal as the difference between said desired heating means temperature and said actual heating means temperature, and for providing control signals to said power control means to drive the magnitude of said error signal to zero.

2. A windshield temperature control system according to claim 1 wherein said heating means is a resistive film.

3. A windshield temperature control system according to claim 1 wherein said heating means is disposed between an inner layer and an outer layer of said windshield.

4. A windshield temperature control system according to claim 3 wherein said heating means is a resistive film.

5. A windshield temperature control system according to claim 1 further comprising mode selection means for selectively operating said windshield temperature control system in a deice mode, a defog mode, or for deactivating said windshield temperature control system.

6. A windshield temperature control system according to claim 5 wherein said heat output is determined to raise the temperature of an external surface of said windshield to a desired external surface temperature to prevent ice formation thereon during operation of said system in said deice mode; and wherein said heat output is determined to raise the temperature of an internal surface of said windshield to a desired internal surface temperature to prevent condensation thereon during operation of said system in said defog mode.

7. A windshield temperature control system according to claim 6 wherein said desired external surface temperature is greater than 0° C.

8. A windshield temperature control system according to claim 6 wherein said desired external surface temperature is a small margin above 0° C.

9. A windshield temperature control system according to claim 6 wherein said desired internal surface temperature is greater than the temperature of the air adjacent to said windshield internal surface.

10. A windshield temperature control system according to claim 6 wherein said desired internal surface temperature is a small margin above the temperature of the air adjacent to said windshield internal surface.

11. A windshield temperature control system according to claim 1 further comprising over temperature means for preventing the provision of said control signals to said power control means in response to the magnitude of said error signal exceeding a threshold magnitude.

12. A windshield temperature control system according to claim 1 further comprising over temperature means responsive to the expiration of a delay period measured from the time said system is activated to either said deice mode or said defog mode for preventing the provision of said control signals to said power control means in response to the magnitude of said error signal exceeding a threshold magnitude.

13. A windshield temperature control system according to claim 1 further comprising over temperature means for preventing the provision of said control signals to said power control means in response to the magnitude of said actual heating means temperature exceeding a threshold magnitude.

14. A windshield temperature control system according to claim 1 further comprising warm-up means for limiting the magnitude of said error signal for purposes of providing control signals to said power control means during a delay period measured from the time said system is activated to either said deice mode or said defog mode.

15. A windshield temperature control system according to claim 1 further comprising warm-up means for filtering said error signal to provide a warm up rate dependent upon the magnitude of said error signal for purposes of providing control signals to said power control means.

16. A windshield temperature control system according to claim 15 wherein said filtering is provided during a delay period measured from the time said system is activated to either said deice mode or said defog mode.

17. A windshield temperature control system according to claim 1 wherein said heat output is determined based upon internal heat loss through an internal surface of said windshield and external external heat loss through an external surface of said windshield, said external heat loss including external convective, evaporative, sensible and radiation heat loss.

18. A windshield temperature control system according to claim 4 further comprising mode selection means for selectively operating said windshield temperature control system in a deice mode, a defog mode, or for deactivating said windshield temperature control system.

19. A windshield temperature control system according to claim 18 wherein said heat output is determined to raise the temperature of an external surface of said windshield to a desired external surface temperature to prevent ice formation thereon during operation of said system in said deice mode, and wherein said heat output is determined to raise the temperature of an internal surface of said windshield to a desired internal surface temperature to prevent condensation thereon during operation in said defog mode.

20. A windshield temperature control system according to claim 19 wherein said desired external surface temperature is greater than 0° C.

21. A windshield temperature control system according to claim 19 wherein said desired external surface temperature is a small margin above 0° C.

22. A windshield temperature control system according to claim 19 wherein said desired internal surface temperature is greater than the temperature of the air adjacent to said windshield internal surface.

23. A windshield temperature control system according to claim 19 wherein said desired internal surface temperature is a small margin above the temperature of the air adjacent to said windshield internal surface.

24. A windshield temperature control system according to claim 19 further comprising over temperature means for preventing the provision of said control signals to said power control means in response to the magnitude of said error signal exceeding a threshold magnitude.

25. A windshield temperature control system according to claim 19 further comprising over temperature means responsive to the expiration of a delay period measured from the time said system is activated to either said deice mode or said defog mode for preventing the provision of said control signals to said power control means in response to the magnitude of said error signal exceeding a threshold magnitude.

26. A windshield temperature control system according to claim 25 further comprising over temperature means for preventing the provision of said control signals to said power control means in response to the magnitude of said actual heating means temperature exceeding a threshold magnitude.

27. A windshield temperature control system according to claim 25 further comprising warm-up means for limiting the magnitude of said error signal for purposes of providing control signals to said power control means during a delay period measured from the time said system is activated to either said deice mode or said defog mode.

28. A windshield temperature control system according to claim 25 further comprising warm-up means for filtering said error signal to provide a warm up rate dependent upon the magnitude of said error signal for purposes of providing control signals to said power control means.

29. A windshield temperature control system according to claim 28 wherein said filtering is provided during a delay period measured from the time said system is activated to either said deice mode or said defog mode.

30. A windshield temperature control system according to claim 27 wherein said heat output is determined based upon internal heat loss through said internal surface of said windshield and external external heat loss through said external surface of said windshield, said external heat loss including external convective, evaporative, sensible and radiation heat loss.

31. A windshield temperature control system according to claim 29 wherein said heat output is determined based upon internal heat loss through said internal surface of said windshield and external external heat loss through said external surface of said windshield, said external heat loss including external convective, evaporative, sensible and radiation heat loss.

32. A windshield temperature control system according to claim 1 wherein said windshield fixed physical properties include windshield surface area, windshield characteristic length, windshield tilt angle, windshield sweep back angle, windshield emissivity, and a windshield geometry correction factor.

33. A windshield temperature control system according to claim 32 wherein said parameters indicative of windshield operating environment include air temperature adjacent to an external surface of said windshield, static pressure, the temperature of the air adjacent to an internal surface of the windshield, and the altitude of the windshield.

34. A windshield temperature control system according to claim 30 wherein said windshield fixed physical properties include windshield surface area, windshield characteristic length, windshield tilt angle, windshield sweep back angle, windshield emissivity, and a windshield geometry correction factor.

35. A windshield temperature control system according to claim 34 wherein said parameters indicative of windshield operating environment include outside air temperature, static pressure, the temperature of the air adjacent to an inside surface of the windshield, and the altitude of the windshield.

36. A windshield temperature control system according to claim 31 wherein said windshield fixed physical properties include windshield surface area, windshield characteristic length, windshield tilt angle, windshield sweep back angle, windshield emissivity, and a windshield geometry correction factor.

37. A windshield temperature control system according to claim 36 wherein said parameters indicative of windshield operating environment include outside air temperature, static pressure, the temperature of the air adjacent to an inside surface of the windshield, and the altitude of the windshield.

* * * * *